United States Patent [19]

Russo

[11] 4,058,350
[45] Nov. 15, 1977

[54] TRACK FOR CRAWLER TYPE VEHICLES

[76] Inventor: Evangelista Russo, Contrada Patrizia, 88050 Sellia Marina (Catanzaro), Italy, 88050

[21] Appl. No.: 668,632

[22] Filed: Mar. 19, 1976

[51] Int. Cl.² ............................................ B62D 55/20
[52] U.S. Cl. ....................................... 305/54; 305/13; 305/56
[58] Field of Search .................... 305/54, 39, 58 R, 55, 305/56; 74/247, 250 R

[56] References Cited
U.S. PATENT DOCUMENTS 3,365,246  1/1968  Otis et al. ........................... 305/58 X
3,851,931  12/1974 Crisafulli ............................... 305/54
3,947,074  3/1976  Nelson ................................... 305/54

Primary Examiner—Robert B. Reeves
Assistant Examiner—John P. Shannon
Attorney, Agent, or Firm—Browdy and Neimark

[57] ABSTRACT

A track for crawler type includes track links having ends which have a curved shape. The shape is asymmetrical relative to the longitudinal axis of links. The tracks include apertured flanges to permit track shoes to be mounted on either rim of the track links. The track shoes are provided with attachments which fasten the shoes to the flanges.

4 Claims, 5 Drawing Figures

TRACK FOR CRAWLER TYPE VEHICLES

The invention relates to a track for crawler type vehicles.

In such tracks, the bushings and pins interconnecting the links wear out quickly, as do those surfaces which engage the front idler wheel, the rear drive wheel and the track rollers. Similarly, those rims of the track links which pass through the guide grooves of these rollers and wheels wear out, while the opposite rims, which carry the track shoes, are protected by the latter. For the sake of brevity, we shall term in the following "external" that side of the track and its components which are turned towards the track shoes and "internal" those which are turned oppositely.

The above mentioned wear renders a periodical maintenance work necessary. The maintenance of the known tracks requires removing the track shoes, in order to get access to the link pins and bushings, extracting the pins and thereafter the bushings from the link plates, thereby disassembling the whole track into its single component parts, reinserting the bushings, so that their unworn surfaces are turned inward, into the link plates, reinserting the pins to interconnect the links, refastening the shoes upon the links etc. All this work did, however, not compensate the wear of the internal link plate rims nor that in the guide grooves of the track rollers and wheels, since the link plates could not be reversed in the known crawlers, because only their external rim was fit to receive the track shoes, nor could one link rotate in both senses with respect to the other, to permit a reversed track to be slung around the idler and the drive wheel.

SUMMARY OF THE INVENTION

It is one object of the present invention to provide a track for crawler type vehicles, wherein the necessity of extracting the track pins and bushings from the link plates during maintenance operations is obviated by rendering the link plates reversible, so that their internal rims can be turned outward to become the external rims of the link plate, and consequently the external, unworn surfaces of the track pins and bushings will take the place of the worn ones.

It is a further object of the invention to provide a track which, after its reversal, presents to the track rollers link rims capable of compensating the wear in their grooves.

It is a still further object of the invention to provide a track whose links and shoes are shaped in such a manner that the latter can be readily fastened, in perfect register, to either side of the link plates.

It is another object of the invention to provide a track whose shoes are fitted with apertures for a constant and efficient elimination of any material accumulating between their internal surface and the underlying link during operation.

Essentially, the track of the invention comprises: links whose ends present a shape which allows each link to rotate in both senses with respect to the adjoining one; link plates provided with means to permit the shoes to be fastened to either of their rims, and track shoes having attachments coacting with said means.

According to an additional feature of the invention, to compensate for the wear of the guide groove profile, the external link rims of a new track link are made with rounded edges and higher than the internal rims. In this manner, the shape of the rim, once the link has been reversed, will match satisfactorily that of the worn grooves.

BRIEF DESCRIPTION OF THE DRAWINGS

For a better understanding of the invention, one of its possible embodiments will now be described, for a purely illustrative and in no way limitative purpose, with reference to the attached drawings, wherein.

DETAILED DESCRIPTION OF THE PREFERRED EMBODIMENT

Figure 1:
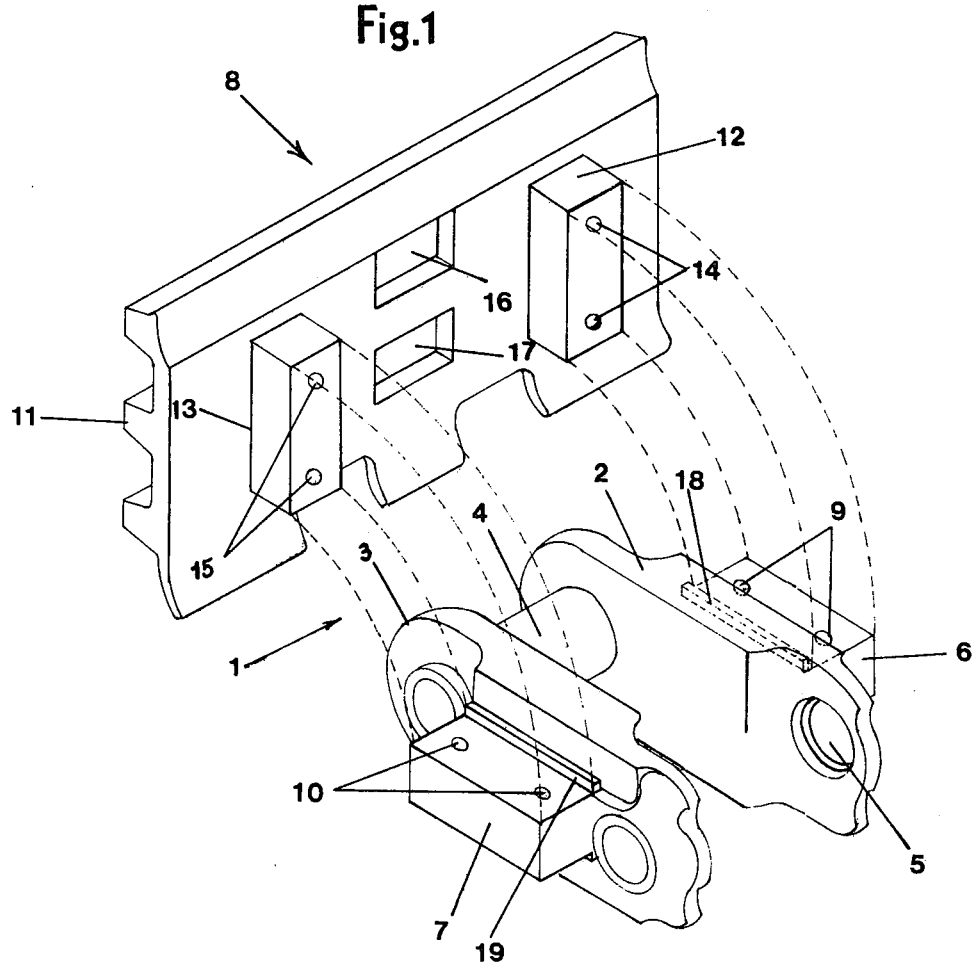
FIG. 1 is a perspective view showing a track link and shoe according to the embodiment.
Figure 5:
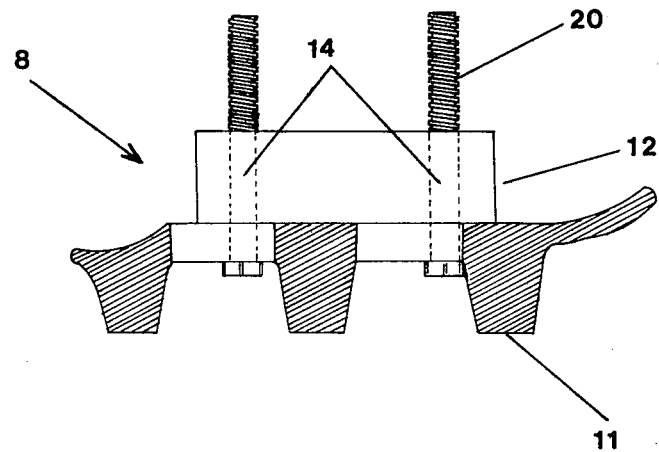
FIG. 5 is a cross sectional view of a shoe.
Figure 2:
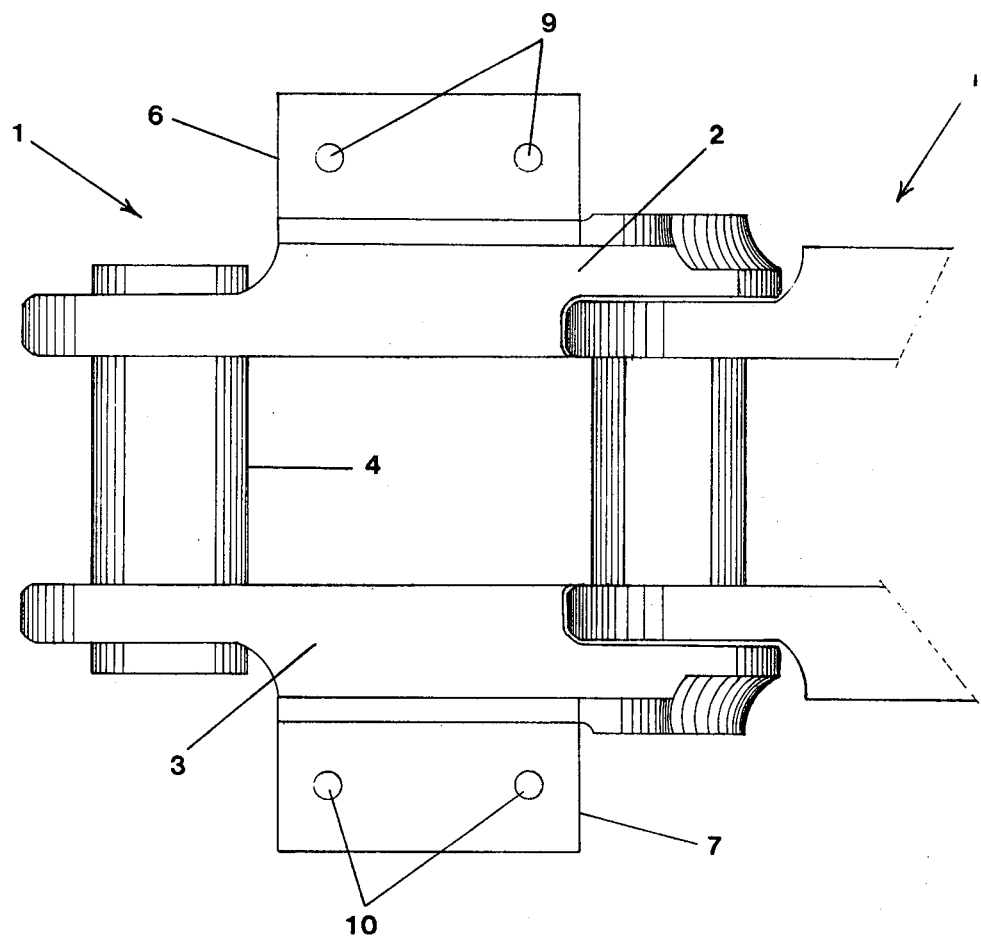
FIG. 2 is a top view of a track link showing its connection with an adjoining link.

In the figures, at 1 there is generally indicated a link consisting of two parallel and spaced apart link plates 2 and 3, which are rigidly interconnected, correspondingly to one of their ends, by a track bushing 4, the terminal portion of bushing 4 slightly projecting through its seats 5 in each link plate. The free ends of each link plate have a profile which permits the link a suitably limited rotation in both senses relative to a link connected with it at said end.

The means for supporting the shoes consist, for each link, of a flange 6 and 7 respectively, projecting from each link plate. Each shoe 8 is fitted with attachments 12 and 13, which come to rest on flanges 6 and 7 respectively when the shoe is fastened, as by bolts passed through holes 14 and 15 in the attachments and into holes 9 and 10 in the flanges to the internal or, after the reversal of the track, to the external rim of the link plates.

Figure 3:
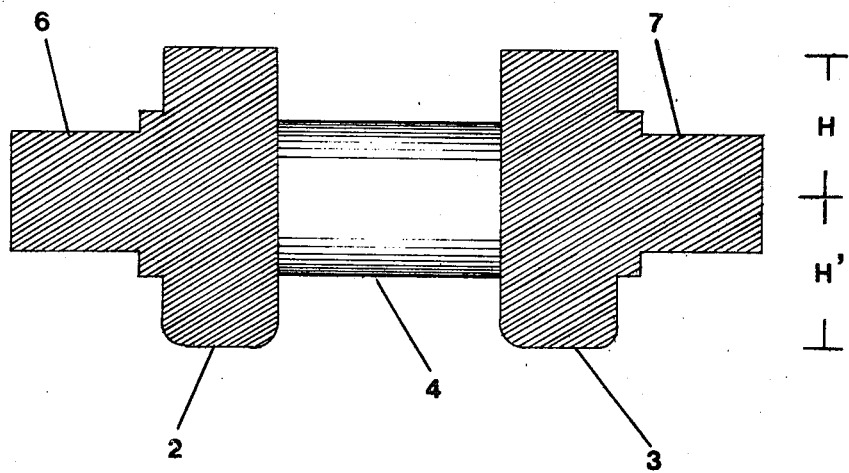
FIG. 3 is a cross sectional view of a link.
Figure 4:
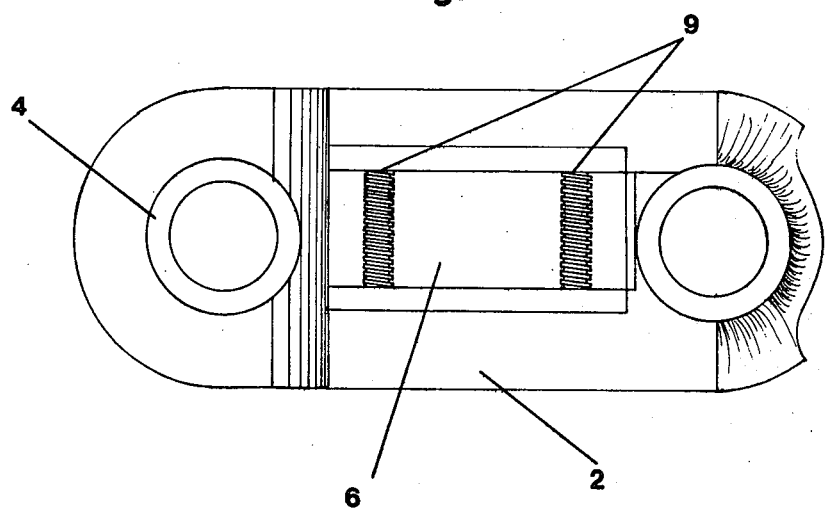
FIG. 4 is a lateral elevational view of the link with a shoe support shown in section.

As better shown in FIG. 3, in a new link, the height H of the top of the internal rim is slightly smaller, taken with reference to the axis of bushing 4, than the height H' of the top of the external rim. In the latter, the edges appear also rounded. This is to compensate for the wear to which the grooves of the track rollers are subjected, because, when the links are reversed, their rims will have to pass through grooves whose profile has become deeper and more rounded than it originally was.

The external and internal surfaces of flanges 6 and 7 may be formed with a step 18 and 19 respectively, to facilitate the centering of the shoes 8 on the flanges 6 and 7.

Intermediate the attachments 12 and 13 the shoes 8 have a plurality of apertures, such as the apertures 16 and 17 in FIG. 1, through which any material accumulating between shoe and link during the movement of the track over the ground may be expelled.

As already stated, the track of the invention, when new, is mounted on the crawler type vehicle so that the link plate rims of height H (FIG. 3) are turned inward, since they have to engage the still unworn guide grooves. When the wear on said rims and grooves renders it necessary, the shoes 8 are removed from the flanges 6 and 7 and the track is reversed, so that now the rims of the greater height H' (FIG. 3) are turned inward, and the shoes 8 bolted to the opposite side of said flanges. Owing to the provision that the links are made rotatable in both senses relatively to each other, the track, even if reversed in the previously described manner, can be readily slung around the drive wheel and the idler wheel of the vehicle.

It is obvious that many changes may be applied to the above described embodiment of the invention by the experts in the art, particularly to the means by which the shoes can be centered and fastened to both sides of the links. Such changes and variants are all encompassed in the idea of the invention.

What is claimed is:

1. A track for crawler type vehicles comprising: track links having a longitudinal axis, each link being composed of bushings and a pair of link plates whose ends have a curved shape to permit each said link to rotate to both sides of the longitudinal axis of the links connected therewith; an external rim and an internal rim on each said link plate, each said external rim being higher than said internal rim; means on each said link plate to permit track shoes to be mounted on either of said rims of said link plates; and track shoes provided with attachments to fasten said track shoes to said link plates.

2. A track according to claim 1, wherein said means to permit said track shoes to be mounted comprise flanges provided on said link plates of said links which coact with said track shoes attachments.

3. A track according to claim 1, wherein said external rims of said link plates include edges which are rounded.

4. A track according to claim 2, wherein a step is provided at the lines of junction between said rims of said link plates of said links and their corresponding said flanges.

* * * * *